US011716201B2

(12) United States Patent
Fabjański

(10) Patent No.: US 11,716,201 B2
(45) Date of Patent: Aug. 1, 2023

(54) SYSTEM AND METHOD FOR MAINTAINING USAGE RECORDS IN A SHARED COMPUTING ENVIRONMENT

(71) Applicant: ASSA ABLOY AB, Stockholm (SE)

(72) Inventor: Krzysztof Fabjański, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 96 days.

(21) Appl. No.: 17/057,442

(22) PCT Filed: May 17, 2019

(86) PCT No.: PCT/EP2019/062811
§ 371 (c)(1),
(2) Date: Nov. 20, 2020

(87) PCT Pub. No.: WO2019/224118
PCT Pub. Date: Nov. 28, 2019

(65) Prior Publication Data
US 2021/0314163 A1 Oct. 7, 2021

Related U.S. Application Data

(60) Provisional application No. 62/674,393, filed on May 21, 2018.

(51) Int. Cl.
*H04L 29/06* (2006.01)
*H04L 9/32* (2006.01)
(Continued)

(52) U.S. Cl.
CPC ............ *H04L 9/3239* (2013.01); *G06F 9/547* (2013.01); *G06F 16/2379* (2019.01);
(Continued)

(58) Field of Classification Search
CPC . H04L 9/3239; H04L 9/3247; H04L 63/0457; H04L 9/50; G06F 16/2379; G06F 9/547; G06F 21/64
See application file for complete search history.

(56) References Cited

U.S. PATENT DOCUMENTS

2003/0212886 A1\* 11/2003 Sugiura ................. H04L 9/0866
713/150
2016/0171205 A1\* 6/2016 Bauer ..................... G06F 21/64
726/26
(Continued)

FOREIGN PATENT DOCUMENTS

WO WO-2019224118 A1 11/2019

OTHER PUBLICATIONS

"International Application Serial No. PCT/EP2019/062811, International Search Report dated Jul. 30, 2019", 5 pgs.
(Continued)

*Primary Examiner* — Malcolm Cribbs
(74) *Attorney, Agent, or Firm* — Schwegman Lundberg & Woessner, P.A.

(57) ABSTRACT

A method for maintaining a log of events in a shared computing environment is provided. One example of the disclosed method includes receiving one or more data streams from the shared computing environment that include transactions conducted in the shared computing environment by a first entity and a second entity that is different from the first entity. The method further includes creating a first blockchain entry for a first transaction conducted in the shared computing environment for the first entity, creating a second blockchain entry for a second transaction conducted in the shared computing environment for the second entity, where the second blockchain entry includes a signature that points to the first blockchain entry, and then causing the first and second blockchain entries to be written to a common blockchain data structure in a database that is made accessible to both the first entity and the second entity.

20 Claims, 9 Drawing Sheets

(51) Int. Cl.
    *G06F 16/23*     (2019.01)
    *G06F 9/54*     (2006.01)
    *G06F 21/64*     (2013.01)
    *H04L 9/40*     (2022.01)
    *H04L 9/00*     (2022.01)

(52) U.S. Cl.
    CPC ............ *G06F 21/64* (2013.01); *H04L 9/3247* (2013.01); *H04L 63/0457* (2013.01); *H04L 9/50* (2022.05)

(56) References Cited

U.S. PATENT DOCUMENTS

2017/0163733 A1*   6/2017   Grefen .................... H04L 67/53
2018/0137306 A1    5/2018   Brady et al.
2020/0119925 A1*   4/2020   Wang ..................... G06Q 20/36

OTHER PUBLICATIONS

"International Application Serial No. PCT/EP2019/062811, Written Opinion dated Jul. 30, 2019", 7 pgs.

Ghoshal, Sanat, et al., "Exploiting Block-Chain Data Structure for Auditorless Auditing on Cloud Data", International Conference on Computer Analysis of Images and Patterns. Caip 2017: Computer Analysis of Images and Patterns; [Lecture Notes in Computer Science; Lect.Notes Computer], Springer, Berlin, Heidelberg, (Nov. 24, 2016), 359-371.

"European Application Serial No. 19725146.5, Response to Communication pursuant to Rules 161(1) and 162 EPC filed Jul. 16, 2021", 19 pgs.

"European Application Serial No. 19725146.5, Communication Pursuant to Article 94(3) EPC dated Jan. 3, 2023", 6 pgs.

* cited by examiner

SYSTEM AND METHOD FOR MAINTAINING USAGE RECORDS IN A SHARED COMPUTING ENVIRONMENT

CROSS-REFERENCE TO RELATED APPLICATIONS

This application is a national stage application of International PCT Patent Application No. PCT/EP2019/062811, titled "SYSTEM AND METHOD FOR MAINTAINING USAGE RECORDS IN A SHARED COMPUTING ENVIRONMENT," filed May 17, 2019, which claims priority to U.S. Provisional Patent Application No. 62/674,393, titled "SYSTEM AND METHOD FOR MAINTAINING USAGE RECORDS IN A SHARED COMPUTING ENVIRONMENT," filed May 21, 2018, each of which is incorporated by reference herein in its entirety.

FIELD OF THE DISCLOSURE

Embodiments of the present disclosure relate to shared computing environments and, in particular, to mechanisms for maintaining usage records in the shared computing environments.

BACKGROUND

Cloud computing is a computing framework that enables ubiquitous and on-demand network access to a shared pool of computing resources that are configurable and capable of being rapidly provisioned and released with minimal inputs from the service provider's point of view. Cloud computing can be deployed in several formats, including, public cloud platforms, private cloud platforms, hybrid cloud platforms, and community cloud platforms. Three of these formats facilitate the sharing of cloud-computing resources among different organizations/tenants. While sharing of such resources is helpful to alleviate the costs associated with operating and maintaining the resources, sharing also presents several challenges. In particular, sharing of cloud-computing resources makes it difficult to accurately maintain usage audit logs for the resources.

Most audit functions aim to provide the following requirements: (1) non-repudiation; (2) sequence integrity and checking; (3) proof of reliable audit; (4) performance, scalability and cost; (5) isolation of tenant audit; (6) security of audit; and (7) durability of logs. It is incredibly difficult to meet all of the above requirements in a cloud-computing environment where the computing resources are shared among a plurality of organizations/tenants.

Not only do audit functions aim to meet the above requirements, but most audit functions will not be desirable unless they can also maintain an adequate durability, are properly scalable, and highly available. Thus, what is needed is an audit function that can meet all of the above requirements and preferences, while operating on shared cloud-computing resources.

SUMMARY

It is with respect to the above that embodiments of the present disclosure were contemplated. In particular, embodiments of the present disclosure contemplate a method for maintaining a log of events in a shared computing environment. One non-limiting example of such a method includes:

receiving one or more data streams from the shared computing environment that include transactions conducted in the shared computing environment by a first entity and a second entity that is different from the first entity;

creating, based on the received one or more data streams, a first blockchain entry for a first transaction conducted in the shared computing environment for the first entity;

creating, based on the received one or more data streams, a second blockchain entry for a second transaction conducted in the shared computing environment for the second entity, wherein the second blockchain entry includes a signature that points to the first blockchain entry; and causing the first and second blockchain entries to be written to a common blockchain data structure in a database that is made accessible to both the first entity and the second entity.

In some embodiments, the one or more data streams include transactions conducted in the shared computing environment by a third entity that is different from the first entity and the second entity, and the method may further include:

creating, based on the received one or more data streams, a third blockchain entry for a third transaction conducted in the shared computing environment for the third entity, wherein the third blockchain entry includes a signature that points to the second blockchain entry; and causing the third blockchain entry to be written to the common blockchain data structure such that the third blockchain entry is made accessible to the third entity.

In some embodiments, the third entity is capable of accessing a payload in the third blockchain entry by using one or more keys to decrypt the payload.

In some embodiments, the third entity is capable of determining that the second blockchain entry exists in the common blockchain data structure but is unable of accessing any payload in the second blockchain entry and wherein the third entity is incapable of determining that the first blockchain entry exists in the common blockchain data structure because the third blockchain entry does not point to the first blockchain entry.

In some embodiments, the signature in the second blockchain entry that points to the first blockchain entry is signed by an audit trail adapter that receives the one or more data streams and wherein an authentication entity authenticates the signature in the second blockchain entry prior to enabling the second blockchain entry to be written to the common blockchain data structure.

In some embodiments, a payload of the first blockchain entry is encrypted with a first encryption key, wherein a payload of the second blockchain entry is encrypted with a second encryption key, and wherein the first encryption key is different from the second encryption key.

In some embodiments, the first transaction occurred in the shared computing environment prior to the second transaction and wherein blockchain entries in the common blockchain data structure are ordered according to a time of occurrence of the transactions.

In some embodiments, the method further includes:

receiving a request, from a requesting entity, for information about blockchain entries related to the first entity;

using a unique identifier assigned to the first entity to identify the blockchain entries in the common blockchain data structure that are related to the first entity; and providing information from the identified blockchain entries back to the requesting entity.

In some embodiments, the method further includes:

receiving, from the requesting entity, one or more keys; and using the one or more keys received from the requesting entity to decrypt payloads of each of the identified blockchain entries.

In one embodiment, the requesting entity is the first entity whereas in other embodiments the requesting entity is different from the first entity.

In some embodiments, the first and second blockchain entries are immutable records in the common blockchain data structure.

In some embodiments, the shared computing environment comprises a plurality of Internet-connected server resources that provide services to client devices on behalf of the first entity and the second entity.

In some embodiments, the method further includes:

receiving the first and second blockchain entries at an Application Programming Interface (API) gateway; and enabling the API gateway to collect the first and second blockchain entries and write the first and second blockchain entries to the common blockchain data structure.

In some embodiments, the method further includes:

analyzing, in real-time, blockchain entries that are written to the common blockchain data structure;

in response to analyzing the blockchain entries that are written to the common blockchain data structure, determining that at least one blockchain entry written to the common blockchain data structure corresponds to an anomalous activity for an entity that is associated with the at least one blockchain entry; and generating one or more reports for the at least one blockchain entry that is determined to correspond to an anomalous activity for the entity that is associated with the at least one blockchain entry.

Another aspect of the present disclosure provides a system that includes:

at least one server having at least one network interface configured to receive one or more data streams from different tenants conducting transactions in a shared computing environment, wherein the at least one server comprises:

an audit trail adapter that generates, based on the one or more data streams, a first blockchain entry for a first transaction that occurs in the shared computing environment at a first time and a second blockchain entry for a second transaction that occurs in the shared computing environment at a second time, wherein the second blockchain entry includes a signature that points to the first blockchain entry.

In some embodiments, the at least one server is further connected to an Application Programming Interface (API) gateway that enables the at least one server to have the first blockchain entry and second blockchain entry written to a common blockchain data structure in a data base that is made accessible to a first entity and a second entity, wherein the first entity is associated with the first transaction, wherein the second entity is associated with the second transaction, wherein the first entity is precluded from accessing a payload of the second blockchain entry, and wherein the second entity is precluded from accessing a payload of the first blockchain entry.

In some embodiments, the second entity is capable of knowing about the existence of the first blockchain entry in the common blockchain data structure by virtue of the signature that points to the first blockchain entry.

Another aspect of the present disclosure provides a system for maintaining a log of events that occur in a shared computing environment, the system comprising:

a first audit server that receives one or more data streams from the shared computing environment that include transactions conducted in the shared computing environment by a first entity and a second entity that is different from the first entity;

a second audit server that receives one or more data streams from the shared computing environment that include transactions conducted in the shared computing environment by a third entity that is different from the first entity and the second entity; and at least one audit trail adapter that communicates with or is installed on the first audit server and the second audit server, wherein the at least one audit trail adapter is configured to:

create, based on the one or more data streams received at the first audit server, a first blockchain entry for a first transaction conducted in the shared computing environment for the first entity;

create, based on the one or more data streams received at the first audit server, a second blockchain entry for a second transaction conducted in the shared computing environment for the second entity, wherein the second blockchain entry includes a signature that points to the first blockchain entry;

create, based on the one or more data streams received at the second audit server, a third blockchain entry for a third transaction conducted in the shared computing environment for the third entity, wherein the third blockchain entry includes a signature that points to the second blockchain entry; and write the first blockchain entry, the second blockchain entry, and the third blockchain entry to a common blockchain data structure in a database that is made accessible to the first entity, the second entity, and the third entity.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
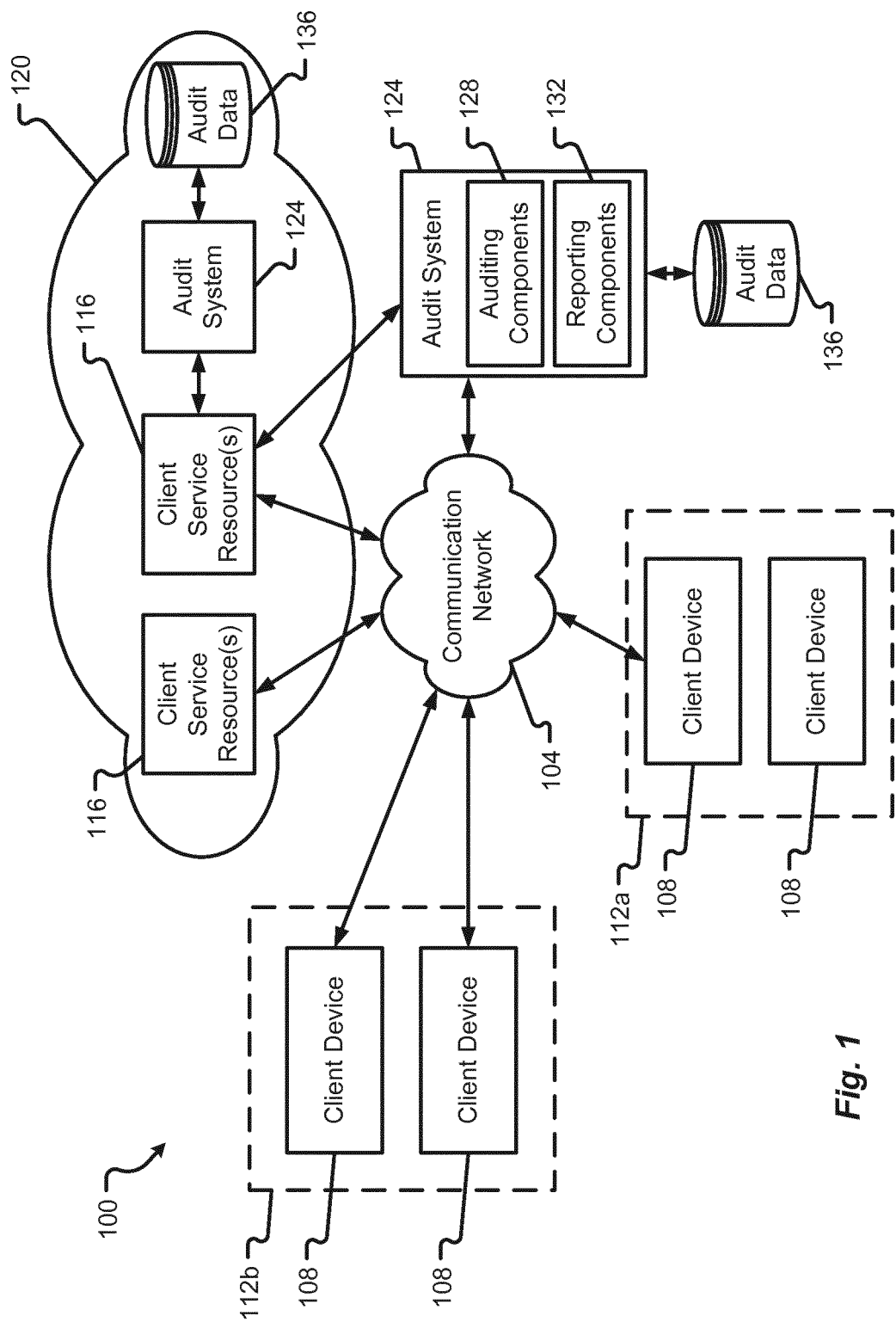
FIG. 1 is a block diagram depicting an illustrative computing system in accordance with at least some embodiments of the present disclosure.

With reference to FIG. 1, an illustrative computing system 100 will be described in accordance with at least some embodiments of the present disclosure. The system 100 is shown to include a communication network 104 that facilitates machine-to-machine communications between one or more client devices 108 and one or more client service resources 116. An audit system 124 is also shown as being connected to the communication network 104.

In some embodiments, the various client devices 108 and client service resources 116 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The client devices 108 may correspond to any type of computing resource that includes a processor, computer memory, and a user interface. The client devices 108 may also include one or more network interfaces that connect the client device 108 to the communication network 104 and enable the client device 108 to send/receive packets via the communication network 104. Non-limiting examples of client devices 108 include personal computers, laptops, mobile phones, smart phones, tablets, etc. In some embodiments, the client devices 108 may be configured to access or utilize the client service resources 116 with one or several applications stored in memory of the client device 108. As an example, a client device 108 may access the client service resource(s) 116 with assistance from a browser application running on the client device 108. Other types of applications such as transaction applications, communication applications, voicemail applications, word processing applications, etc. may also be used on the client device 108 to access the client service resource(s) 116.

In some embodiments, the client devices 108 may be owned, operated and/or administered by different entities 112a, 112b. As a non-limiting example, some of the client devices 108 may be owned, operated and/or administered by a first entity 112a whereas other client devices 108 may be owned, operated and/or administered by a second entity 112b. It should be appreciated that other client devices 108 may not necessarily be grouped and belong to an entity. For instance, a single client device may be associated with an entity without departing from the scope of the present disclosure. Additionally, although FIG. 1 only depicts two entities 112a, 112b sharing the client service resources 116, it should be appreciated that many more than two entities may share the client service resources 116 without departing from the scope of the present disclosure.

The client service resource(s) 116 are depicted as belonging to a shared computing environment 120. As a more specific reference, the client service resource(s) 116 may be referred to as cloud-computing resources in that the resource(s) 116 are part of a cloud platform, which is connected to a communication network 104 and is made available to a plurality of different client devices 108 being owned, operated and/or administered by different entities 112*a*, 112*b*. The shared computing environment 120 may be configured as one or more of a public cloud platform, a hybrid cloud platform, or a community cloud platform. As an example, the shared computing environment 120 may be a cloud computing platform such as the Amazon Web Services platform, Microsoft Azure platform, Google cloud platform, or IBM cloud platform. The configuration of the shared computing environment 120 facilitates the sharing of resources 116 among different entities 112*a*, 112*b*, which may also be referred to as different organizations or different tenants. While sharing of such resources 116 is helpful to alleviate the costs associated with operating and maintaining the resources 116, sharing of the resources 116 makes it difficult to maintain tamper resistant usage audit logs for the resources 116. As will be discussed in further detail herein, the audit system 124 may be provided with one or several components that enable an accurate and secure tracking of the usage of resources 116 by the various client devices 108 owned, operated and/or administered by different entities/ tenants 112*a*, 112*b*. The client service resource(s) 116 may be provided as one or more servers (or virtualized servers) operating in a cloud platform. As such, the client service resources 116 may include one or multiple processors, one or multiple computer memory devices, and one or more network interfaces that enable the server to communicate via the communication network 104.

FIG. 1 also shows that the audit system 124 may be configured to communicate directly with the one or more client service resources 116. As an example, the resource(s) 116 may be configured to send a data stream or multiple data streams to the audit system 124. Whether received directly from the resource(s) 116 or via the communication network 104, the audit system 124 may be configured to process the multiple data streams received from the shared computing environment 120. In some embodiments, the audit system 124 may include auditing components 128 that enable the audit system 124 to generate audit logs for the usage of resource(s) 116 by the different entities/tenants 112*a*, 112*b*. Audit logs or information related to audit logs may be stored, temporarily or permanently, in an audit log database 136. As will be discussed in further detail herein, the audit system 124 may utilize the auditing components 128 to enable the various entities/tenants 112*a*, 112*b* to access their audit log data from the audit log database 136 without exposing audit log data for other entities that are also using the resource(s) 116 and having their usage information stored in the audit log database 136.

In addition to the auditing components 128, the audit system 124 may include reporting components 132 that enable the audit system 124 to generate reports for the entities/tenants 112*a*, 112*b* and/or allow the entities/tenants 112*a*, 112*b* to search within the audit log database 136. Alternatively or additionally, the reporting components 132 may be configured to generate usage reports for entities other than the entities/tenants 112*a*, 112*b* that are using the resources 116. For instance, the reporting components 132 may be used to provide audit logs or historical usage information for the resources 116 to independent third parties, such as financial auditors, compliance auditors, governmental entities, or any other entity that has a legitimate interest in the usage information for the resource(s) 116 but does not otherwise utilize the resource(s) 116 themselves.

FIG. 1 also shows that the audit system 124 and audit log database 136 may be provided within the shared computing environment 120. This configuration of system elements may be an alternative arrangement to having the audit system 124 and audit log database 136 positioned outside the shared computing environment 120. Thus, in some embodiments, the entirety of the audit log solution may be completely self-contained within the shared computing environment 120 rather than being provided as a system or service outside the shared computing environment. As a more specific, but non-limiting example, the functionality of the audit system 124 may be provided on top of one of the client service resource 116, although such a configuration is not a requirement.

Figure 2A:
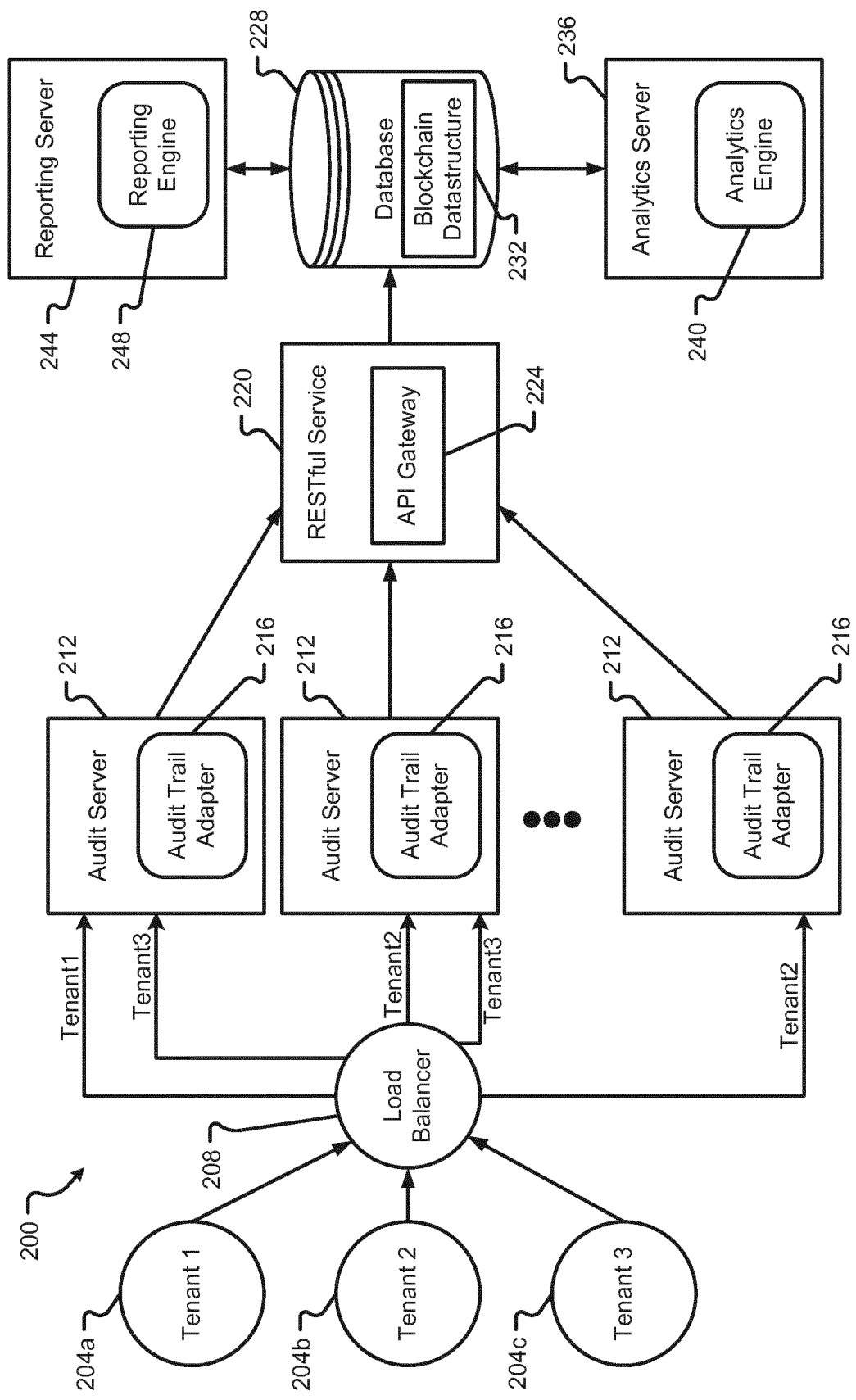
FIG. 2A is a block diagram depicting details of an audit and reporting system having a first configuration in accordance with at least some embodiments of the present disclosure.
Figure 2B:
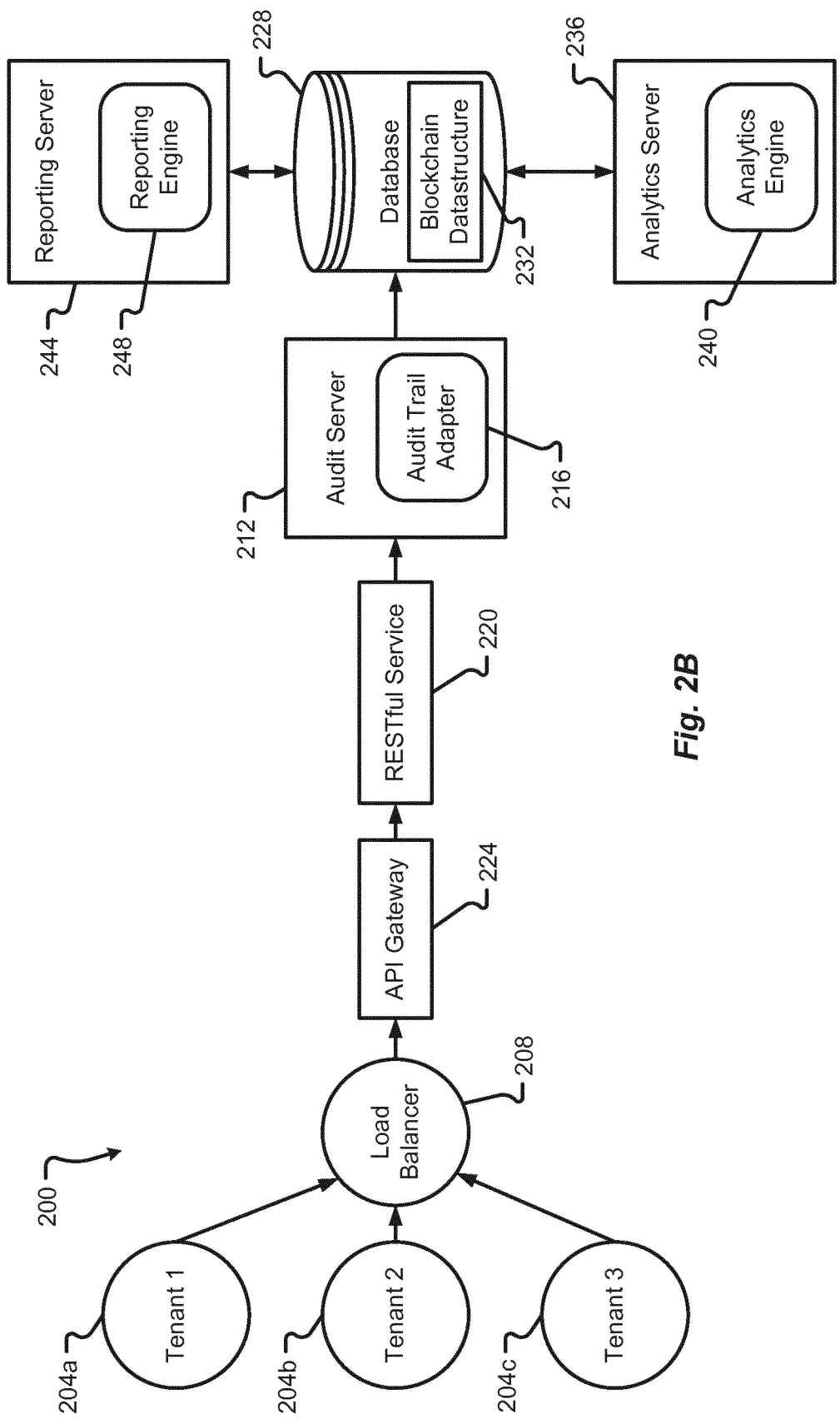
FIG. 2B is a block diagram depicting details of an audit and reporting system having a second configuration in accordance with at least some embodiments of the present disclosure.

With reference now to FIGS. 2A and 2B, additional details of an audit system 200 will be described in accordance with at least some embodiments of the present disclosure. A first possible configuration of system 200 is shown in FIG. 2A. The system 200 may be similar or identical to the audit system 124 depicted in FIG. 1. It should further be noted that some or all of the components of system 200 may be provided as part of a client device 108. Moreover, one, some, or all of the components depicted in system 200 may be provided in any type of configuration and not all of the components may be required to provide the desired functionality of the system 200 described herein.

With reference initially to FIG. 2A, the system 200 is shown to include a plurality of tenant inputs 204*a*, 204*b*, 204*c* that are fed to a load balancer 208. The plurality of tenant inputs 204*a*, 204*b*, 204*c* may be received as raw data streams from the client service resources 116. In some embodiments, the inputs may include information that describe transactions conducted in the shared computing environment 120 on behalf of the various entities/tenants that are logging in/out, accessing, using, and sharing the resources 116 within the environment 120. The tenant inputs 204*a*, 204*b*, 204*c* may optionally be provided to the load balancer 208 in an encrypted or unencrypted format, depending upon the sensitivity of the usage data and whether or not the system 200 is contained within the shared computing environment 120 and is directly accessing the resources 116 or if the tenant inputs 204*a*, 204*b*, 204*c* are being communicated over an untrusted communication network 104. As a non-limiting example, the tenant inputs 204*a*, 204*b*, 204*c* may each correspond to streams of data that describe transactions executed by clients of entities/ tenants within the resources 116. The data contained in the streams 204*a*, 204*b*, 204*c* may include: a relative time that a transaction occurred; an actual time that a transaction occurred; an identification of an entity/tenant that conducted the transaction; an identification of a particular resource 116 that conducted the transaction; an identification of transaction type; an identification of a client 108 that requested the transaction; an identification of other parties to the transaction; and combinations thereof.

The load balancer 208 may be implemented as a simple data switch or a more intelligent switch/server that is able to analyze the various inputs 204*a*, 204*b*, 204*c* and redirect those inputs to an appropriate audit server 212. In some embodiments, the load balancer 208 attempts to ensure that particular tenant inputs are only provided to a subset of the audit servers 212. In some embodiments, the load balancer 208 may utilize one or more load balancing techniques (e.g., round robin, weighted round robin, least connection, chained failover, weighted response time, source IP hash, etc.) to determine which of the audit servers 212 are to receive a particular tenant input 204*a*, 204*b*, 204*c*. It should be appreciated that the load balancer 208 may not be required in instances where a single audit server 212 is used to process all of the tenant inputs 204*a*, 204*b*, 204*c*. In a system 200 having two or more audit servers 212, the load balancer 208 is useful to ensure that no single audit server 212 becomes overloaded or underloaded as compared to other audit servers 212 in the group of audit servers 212.

In the depicted embodiment, each audit server 212 is provided with an audit trail adapter 216, which may correspond to instructions stored in memory of the audit server 212 that are executed by a processor of the audit server 212 in connection with creating and maintaining audit logs for the various tenant inputs 204a, 204b, 204c. Each audit trail adapter 216 may be similar or identical to other audit trail adapters 216 in the various audit servers 212. In some embodiments, each audit trail adapter 216 is configured to receive the data stream inputs from the load balancer 208 and then create, based on the one or more data streams, blockchain entries for transactions conducted in the shared computing environment 120. As the audit trail adapters 216 may be configured to generate multiple blockchain entries, each subsequently-generated blockchain entry may be created to include a signature that points back to a blockchain entry previously generated by the audit trail adapter 216. In this way, a plurality of blockchain entries can be created and linked together for writing to a blockchain data structure 232.

The example of FIG. 2A shows one instance of an audit server 212 receiving data from the first tenant's data stream 204a and the third tenant's data stream 204c, another instance of an audit server 212 receiving data from the second tenant's data stream 204b and the third tenant's data stream 204c, and another instance of an audit server 212 receiving data from the second tenant's data stream 204b. In some embodiments, each audit trail adapter 216 of each audit server 212 is configured to capture the data streams originating from various sources 204a, 204b, 204c and record them in individual blockchain entries. Audit trail records may then be combined at an Application Programming Interface (API) gateway 224, which is hosted by a RESTful service 220. The API gateway 224 is configured to combine and coordinate the writing of the blockchain entries generated by the various audit servers 212 into a common blockchain data structure 232, which can be stored in a database 228. Each blockchain entry generated at the audit trail adapters 216 may be represented by a PlatformID (e.g., identifying an originating application) and/or a TenantID (e.g., identifying an individual entity/tenant). The originating audit trail adapter 216 can, but does not have to, provide a sequence number for individual audit trail records or entries being written to the audit trail records. As an example, the audit trail adapters 216 may generate sequence numbers or the API gateway 224 may generate the sequence numbers on behalf of each audit trail adapter 216; however, in a multi-node configuration, distributed application flows of the audit trail records must happen asynchronously to fulfill scalability requirements, which could affect the real chronological order. To minimize this negative effect, either the client service resource(s) 116 or the audit trail adapters 216 can generate the sequence numbers or timestamps. If sequence numbers or timestamps are not generated in this way, then the analytics engine 240 and/or reporting engine 248 may be left to judge/determine the chronological order of the audit log entries maintained in the blockchain data structure 232 based on the generated sequence number (which could be misleading) and/or the timestamps (which could be also misleading).

In some embodiments, the various servers that are responsible for generating timestamps for a transaction may have their clocks synchronized with one another. As a more specific example, all applications nodes may be synchronized within an auto-scaling group. To achieve this it may be desirable to utilize the Network Time Protocol (NTP) and a time-synchronization service. Such synchronization helps to ensure each audit server 212, for example, is operating with clocks that are substantially or at least nearly synchronized (e.g., within an acceptable tolerance, such as 1-10 ms, of each other).

As can be appreciated, the database 228 may be configured to store some or all of the blockchain data structure 232 and the blockchain data structure 232 may be made available to some or all of the entities/tenants that are utilizing the shared computing environment 120 and having their resource utilizations logged and audited. In some embodiments, the blockchain data structure 232 may be replicated across one or more databases 228. For example, databases 228 may be hosted within separate cloud platforms or maintained on servers owned, operated and/or administered by different entities. Access to the database 228 may be made via database lookup requests that identify a particular blockchain entry to be retrieved. In this situation, the blockchain entry may be retrieved from the blockchain data structure with reference to a particular blockchain entry identifier. Alternatively or additionally, access to the database 228 may be made via a lookup request that identifies a tenant identifier, platform ID, or the like, and all entries found in the blockchain data structure 232 can be returned to the requesting entity (assuming the requesting entity provided appropriate proof of access to those entries). It should also be noted that the database 228 may be accessible through the RESTful service 220 and/or API 224.

An analytics server 236 may be utilized to execute an analytics engine 240. In some embodiments, the analytics engine 240 is used to analyze entries made to the blockchain data structure 232 to determine if one or more entries correspond to anomalous entries. This analysis may occur as entries are written to the data structure 232 or offline after multiple entries have been written to the data structure 232. As can be appreciated, the analytics engine 240 may have access to one or more usage models that describe normal or expected usage behaviors for the shared computing environment. These models of normal or expected usage behaviors may be entity/tenant specific or generic to a plurality of entities/tenants. In the event that one or more blockchain entries written to the blockchain data structure 232 fall outside of the models of normal or expected usage behaviors (e.g., an anomalous behavior is detected), then analytics engine 240 may interface with a reporting engine 248 operated by a reporting server 244 to generate a report or alert for the entity/tenant associated with the anomalous behavior.

The reporting engine 248 may be configured to generate reports that describe entries made to the blockchain data structure 232 or transactions described within those blockchain entries. As an example, the reporting engine 248 may be configured to generate periodic/regular reports about each entity's/tenant's usage of the resource(s) 116 over a predetermined amount of time (e.g., daily, weekly, monthly, etc.). Alternatively or additionally, the reporting engine 248 may be configured to generate special non-periodic reports in response to the analytics engine 240 detecting anomalous usage behaviors of any entity or tenant. These non-periodic reports may be transmitted to the same recipients of the periodic/regular reports or the non-periodic reports may be transmitted to other recipients. In some embodiments, recipients of the reports generated by the reporting engine 248 may include personnel within an associated entity/ tenant or third parties that do not belong to the associated entity/tenant. As an example, regular reports may be generated and sent to a comptroller working within an associated entity and/or to an external auditing authority. Access to the reports for the external auditing authority may require approval from the comptroller working within the associated entity and such authority may be granted by sharing a unique tenant ID assigned to the entity or by sharing one or more decryption keys used by the entity to decrypt payloads of blockchain entries. It should be appreciated that the reporting server 244 and analytics server 236 may access the database 228 using any type of known blockchain or database-accessing protocols known in the art.

Although the database 228 is depicted as a centralized database that stores the blockchain data structure 232, it should be appreciated that embodiments of the present disclosure are not so limited. For instance, the database 228 may actually be managed autonomously using a peer-to-peer network and the distributed timestamping servers 212. Entries to the blockchain data structure 232 may be authenticated by mass collaboration of distributed client devices, which may or may not belong to the various entities/tenants 212. As is known in blockchain technologies, the actual blockchain entries in the blockchain data structure 232 may be stored among a plurality of different and distributed devices that are participants to the blockchain peer-to-peer network. Because a peer-to-peer network may be used for the database 228, it should be appreciated that the analytics server 236 and/or reporting server 244 may be member participants to the peer-to-peer network. In addition to accessing blockchain entries made to the data structure, the resources of the servers 236, 244 may also be used to authenticate entries prior to allowing such entries to be written to the data structure 232. Further still, in the sense of a cloud-computing environment, the database 228 may be automatically distributed and may not necessarily be provided as a peer-to-peer network.

FIG. 2B depicts a second configuration of the system 200 whereby the functionality of the audit server 212 and/or audit trail adapter 216 is provided behind the API gateway 224 and/or RESTful service 220. It should be noted that the RESTful service 220 may correspond to an optional component to help speed up the overall operations of the system 200. In this particular configuration, the audit trail adapter 216 is positioned behind the API gateway 224, making it possible to provide the audit trail adapter 216 within a cloud-computing environment. Although not depicted, it should also be appreciated that the audit trail adapter 216 may have its own load balancer 208 rather than relying upon the capabilities of an external load balancer 208. This particular configuration may also enable the load of an audit trail service to be moved to client devices (e.g., in an embodiment where client devices are enabled to calculate their own sequence numbers).

Figure 3:
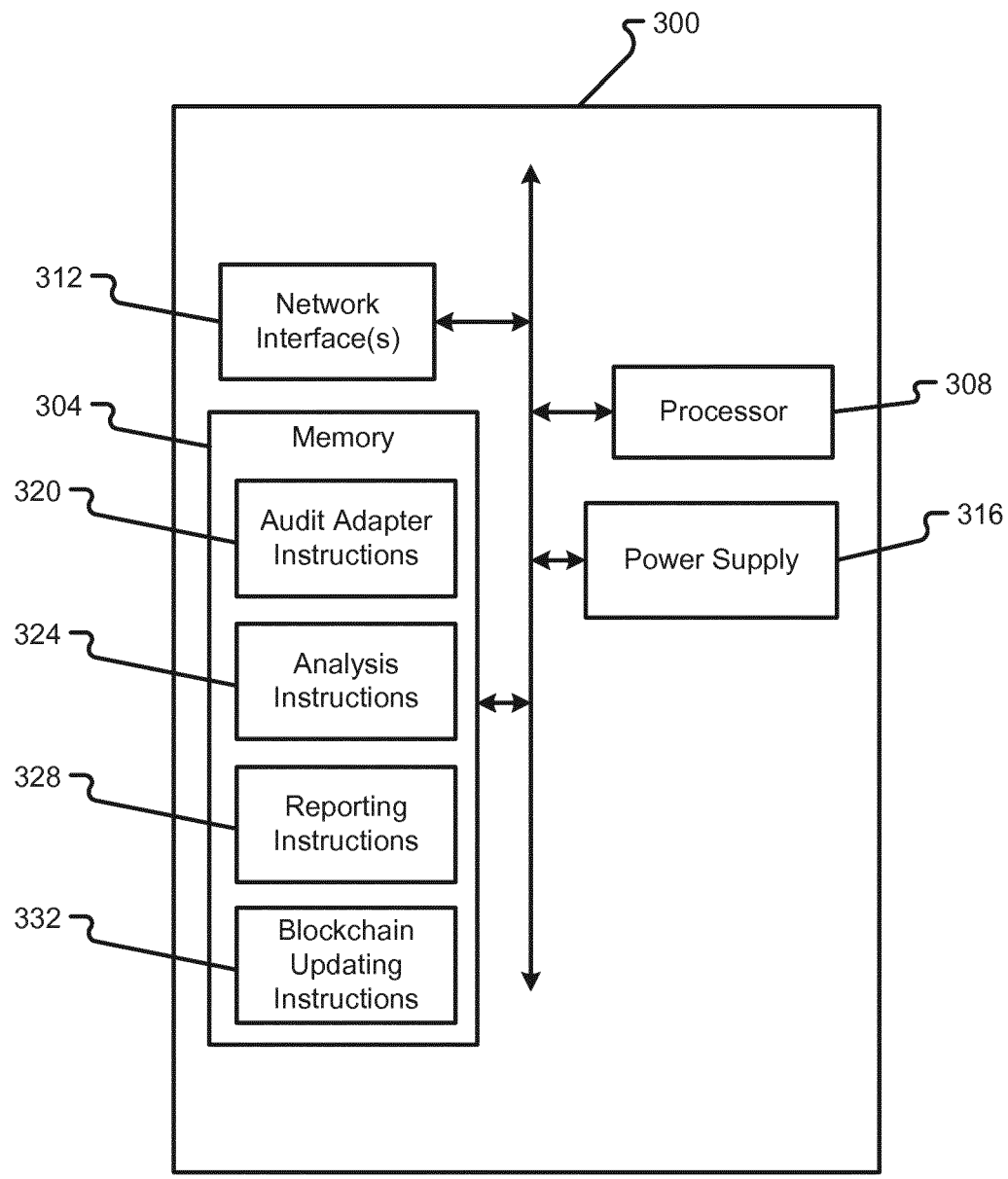
FIG. 3 is a block diagram depicting details of a server in accordance with at least some embodiments of the present disclosure.

With reference now to FIG. 3, additional details of a server 300 will be described in accordance with at least some embodiments of the present disclosure. The server 300 may correspond to an example of a client service resource 116, an audit server 212, an analytics server 236, a reporting server 244, or any other type of server/computing device depicted and described herein. Although the server 300 is shown as having various components to perform the functionality associated with multiple types of servers described herein, it should be appreciated that different physical servers or different virtualized servers may be used for the different server functions. For example, an instance of a server 300 may be used as the analytics server 236 whereas another instance of a server 300 may be used as the reporting server 244. It may be possible, however, to have an instance of a server 300 provide multiple functions. For example, one instance of a server 300 may include functionality to behave as an audit server 212 as well as an analytics server 236. The depiction of the server 300 as a single device is simply for ease of conversation and understanding and should not be construed as limiting embodiments of the present disclosure.

The server 300 is depicted to include one or more processors 308, memory 304, one or more network interfaces 312, and a power supply 316. If embodied as something other than a server, the server 300 may further include user input and/or output devices.

The processor 308 may include one or more CPUs, General Processing Units (GPUs), Integrated Circuit (IC) chips, microprocessors, etc. Alternatively or additionally, the processor 308 may include other hardware components that are capable of executing the instructions stored in memory 304.

The memory 304 may be configured to store processor-executable instructions in volatile or non-volatile memory devices. The types of instructions that may be stored in memory 304 include, without limitation, audit adapter instructions 320, analysis instructions 324, reporting instructions 328, and blockchain updating instructions 332. The audit adapter instructions 320 may enable the server 300 to operate as or behave like the audit server 212. More specifically, the audit adapter instructions 320 may enable functionality of the audit trail adapter 216. For instance, the audit adapter instructions 320 may include instructions that cause the processor 308 to generate blockchain entries, populate those entries with appropriate information, and cause the entries to point or refer to previously-generated entries. Furthermore, the audit adapter instructions 320 may include instructions that enable the processor 308 to sequence blockchain entries and/or create sequence ID/timestamp information for inclusion with the blockchain entries.

The analysis instructions 324 may enable the server 300 to operate as or behave like the analytics server 236. More specifically, the analysis instructions 324 may include instructions that enable the processor 308 to access the blockchain data structure 232, analyze particular entries made to the blockchain data structure 232, and determine if such entries fall within or outside of an expected behavior pattern. The analysis instructions 324 may be configured to analyze specific blockchain entries or a collection of blockchain entries. The analysis may be performed on contents of a blockchain entry.

The reporting instructions 328 may enable the server 300 to operate as or behave like the reporting server 244. More specifically, the reporting instructions 328 may include instructions that enable the processor 308 to generate one or more reports for transmission to various concerned users/persons/entities/tenants. For instance, the reporting instructions 328 may include information that describes what information to include in a particular report, how to format the information for the particular report (e.g., a definition of file type to use and layout preferences), and how to transmit the particular report to a predetermined recipient (e.g., via email, text message, SMS message, etc.).

The blockchain updating instructions 332 may enable the server 300 to act as a participant in the peer-to-peer blockchain network that maintains and updates the blockchain data structure 232. In some embodiments, the blockchain updating instructions 332 enable the processor 308 to authenticate or validate blockchain entries prior to allowing such entries to be written to the blockchain data structure 232. For example, the blockchain updating instructions 332 may include instructions for analyzing a signature included in a blockchain entry, compare the signature against blockchain entries already written to the blockchain data structure 232, and determine if the signature is a valid signature and refers to a valid blockchain entry. As can be appreciated, the blockchain data structure 232 may correspond to a distributed ledger describing transaction information for the shared computing environment 120. As such, the data structure 232 may be immutable and entries written thereto should not be capable of being re-written or modified. Rather, modifications to the entries may only be made by writing a new entry to the blockchain data structure 232.

The network interface(s) 312 may correspond to one or more hardware devices that connect the server 300 to the communication network 104. For instance, the network interface(s) 312 may include one or more wired or wireless serial or parallel data ports. As a more specific example, the network interface(s) 312 may include an Ethernet port, a SCSI port, or the like. The network interface(s) 312 may also include drivers for the hardware components thereof.

The power supply 316 may correspond to internal and/or external power supply devices. For instance, the power supply 316 may correspond to a battery pack, capacitive charge device, or the like. Alternatively or additionally, the power supply 316 may correspond to a power adapter that enables the server to receive AC power from an external outlet and convert that AC power into DC power or useable power for the components of the server.

Figure 4:
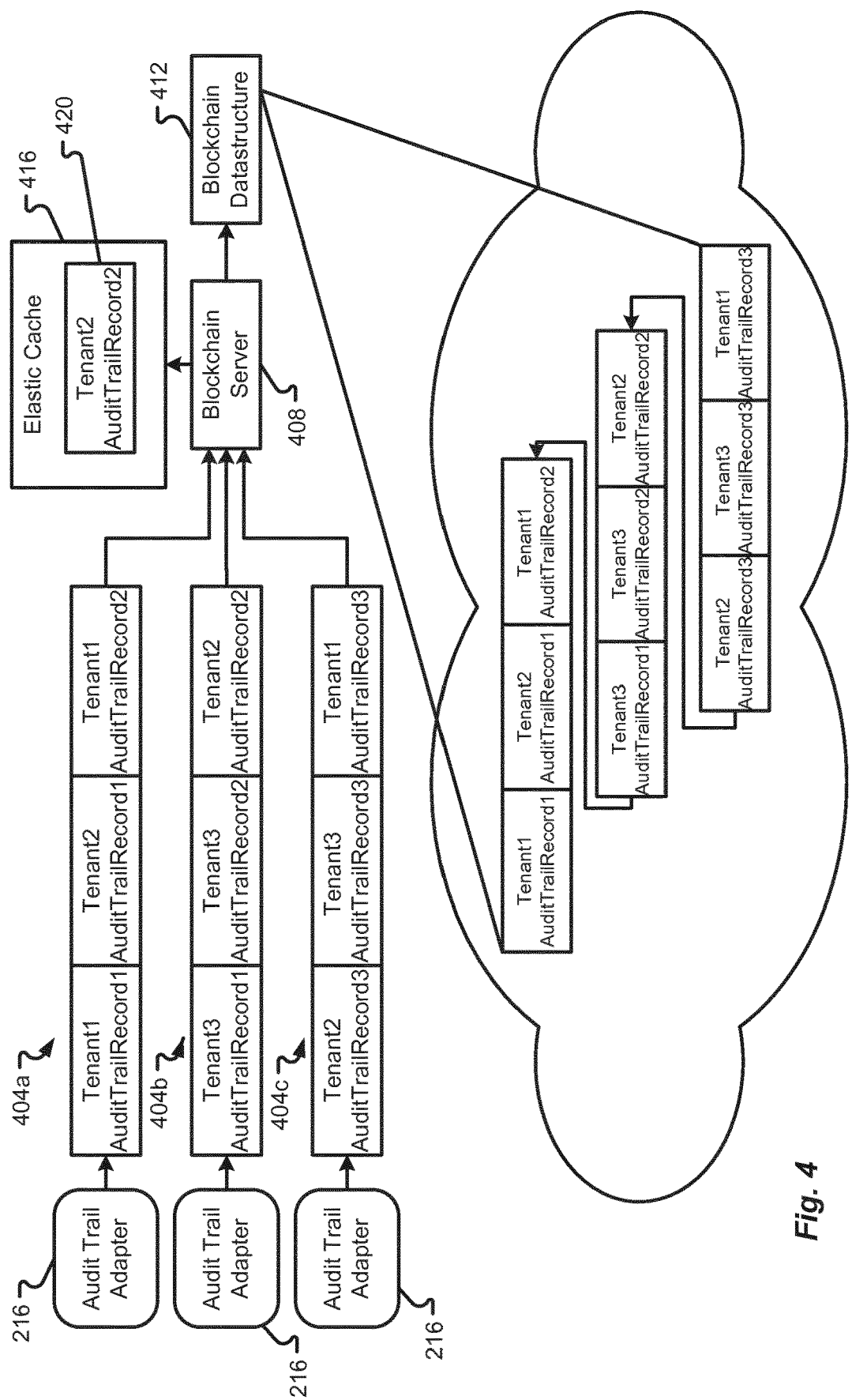
FIG. 4 is a block diagram depicting details of a data structure used in accordance with at least some embodiments of the present disclosure.
Figure 5:
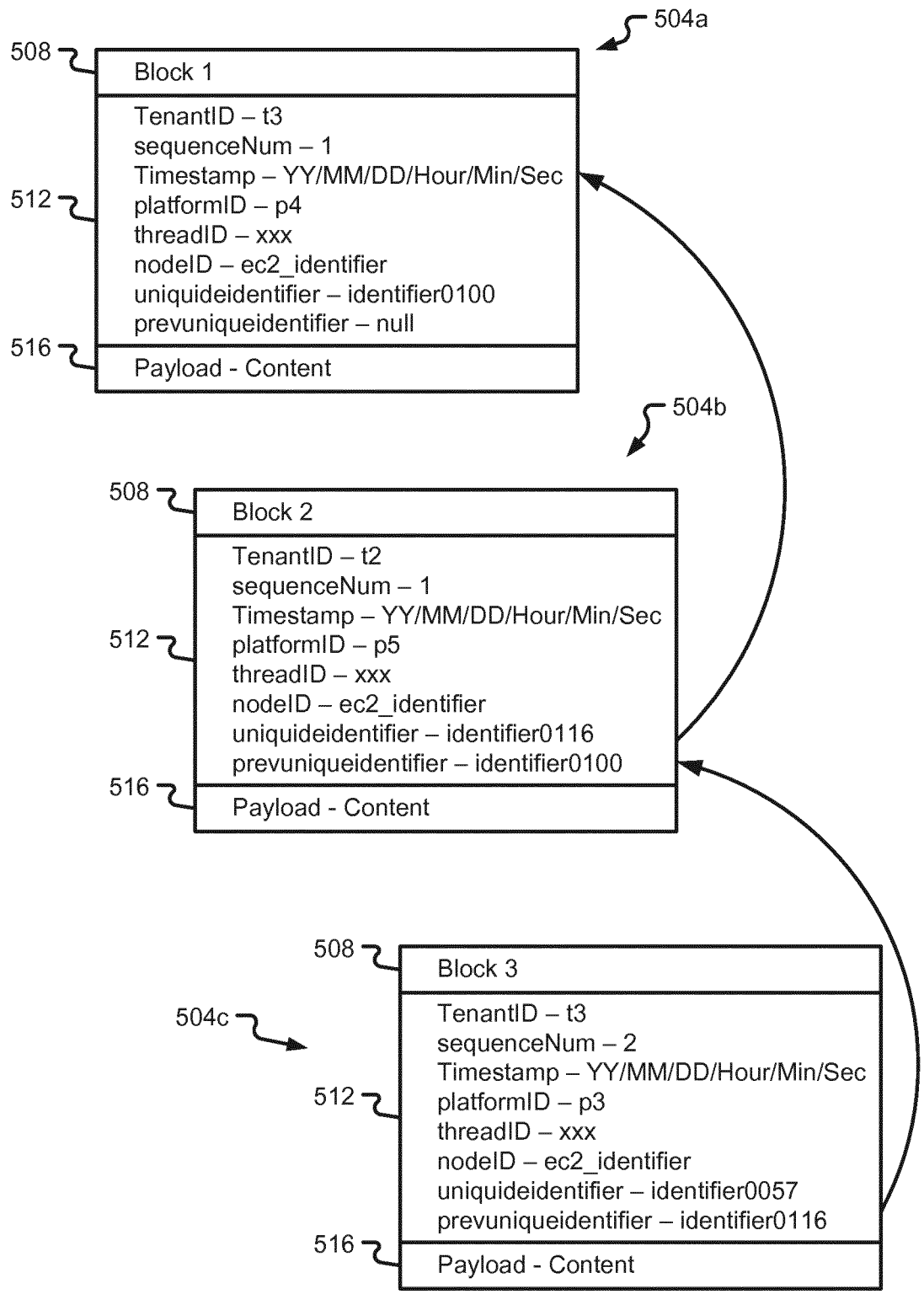
FIG. 5 is a block diagram depicting further details of entries in a data structure in accordance with at least some embodiments of the present disclosure.

With reference now to FIGS. 4 and 5, additional details of the blockchain data structure 232 and entries that can be made thereto will be described in accordance with at least some embodiments of the present disclosure. With reference initially to FIG. 4, it can be seen that the different audit trail adapters 216 are configured to write their own sets of blockchain entries 404a, 404b, 404c. As can be appreciated, the blockchain entries written by any of the audit trail adapters 216 may depend upon the data stream or transaction details received from the various tenant inputs 204a, 204b, 204c. In the illustrative example, one audit trail adapter 216 generates a first entry for a first tenant, followed by a first entry for a second tenant, followed by a second entry for the first tenant. Each entry may point to a previous entry in the set of entries 404a. Furthermore, each entry in the set of entries 404a may be ordered according to a time of occurrence or sequenced order. This effectively means that the first entry for the first tenant correspond to a transaction that occurred within the shared computing environment 120 prior to a transaction described in the first entry for the second tenant. As such, the first entry for the second tenant may include a signature that points to the first entry for the first tenant.

Each set of entries 404a, 404b, 404c may be provided to a blockchain server 408, which is configured to write one or more entries 420 to an elastic cache 416 as well as write one or more entries to the blockchain data structure 412. It should be appreciated that the blockchain data structure 412 may be similar or identical to blockchain data structure 232.

In some embodiments, the blockchain server 408 may be executed within the RESTful service 220, as part of the audit servers 212, or in some other server connected to the various components depicted in FIG. 2. The blockchain server 408 may be configured to process sets of entries 404 received from the various audit trail adapters 216 in batches (e.g., in batches of 1000 entries). Alternatively or additionally, this batch processing may be performed at the audit trail adapters 216, meaning that batches of entries are sent to the server 408 in the form of sets of entries 404. After processing a batch of entries 404 in an audit trail adapter 216, it may be desirable to leverage the shared elastic cache 416 to write a hash(es) of a last processed event(s) in the set of entries 404. In this way other nodes (e.g., other audit trail adapters 216) can still re-use previously created blockchain entries that were created by other nodes to build the common blockchain data structure 412.

The blockchain server 408 may also provide a data integrity service by creating a chronological record of the time the entries are signed, the identity of who signed the entries, and assurance that the entries have not been changed after being signed. This can provide an auditable trail of the chain of custody. Independent verification of the integrity of entries is possible using the media published publication code and the signature to prove the integrity of the entries. The lifecycle integrity of entries can be monitored by continuously verifying the entries in near-real-time and generating alerts at the reporting engine 248 in the event of a failure To achieve these features, the blockchain server 408 could be configured to store hashes of blockchain entries in a separate place than the blockchain data structure 412 (e.g., in the elastic cache 416). In some embodiments, the hashes of the blockchain entries can be calculated on timestamps and other non-encrypted data contained in the entries. Storing hashes outside the blockchain data structure 412 would give another confidence level that when data which has been already recorded is corrupted, tampering can still be detected.

FIG. 4 further shows how the various sets of blockchain entries can be linked to one another within the blockchain data structure 412. This linking, as discussed above, can be ordered according to time of transaction or sequence number. Thus, the earlier entries in the blockchain data structure 412 may represent transactions that occurred prior to other entries in the blockchain data structure 412, regardless of which entity/tenant performed the transaction and which resource 116 was used to perform the transaction.

FIG. 5 depicts further details of blockchain entries 504a, 504b, 504c that may be created and added to the blockchain data structure 412. Each blockchain entry may include a block identification portion 508, a publicly-available data portion 512, and a payload portion 516. In some embodiments, the payload portion 516 may undergo pseudonymization such that sensitive data (e.g., personal identifiable information) is replaced by one or more artificial identifiers or pseudonyms. In this manner, the sensitive data can be masked (less identifiable) while remaining suitable for data analysis and processing. In one embodiment, the payload portion 516 may be tokenized with a tokenization service. In such an embodiment, each tenant would be provided with its own tokenization dictionary grouped per the tenant's user, thereby ensuring that no sensitive information is exposed within the payload portion 516.

An entry may also include a signature or pointer to the previous entry written to the blockchain data structure 412. As an example, the second entry 504b is shown to have a signature that points to the first entry 504a. This signature may correspond to a signature that references the unique identifier of the previous entry in the blockchain data structure (e.g., prevuniqueidentifier—identifier0100, which is the unique identifier previously assigned to the first entry 504a).

When a transaction event is logged as an entry 504, the entry may contain details that provide enough information about the transaction event to provide the necessary context of who conducted the transaction, what conducted the transaction, when the transaction was conducted, and where the transaction occurred. Specifically, the following fields may be useful in an audit log:

- Actor—The username, uuid, API token name of the account/entity/tenant taking the action (e.g., TenantID), or the like.
- Group—The group (e.g., organization, team, or account within the entity) that the entity is a member of (needed to show admins the full history of their group).
- Where—IP address, device ID, country (e.g., platformID or nodeID), or the like.
- When—The NTP synced server time when the event happened (e.g., in YY/MM/DD/Hour/Min/Sec).
- Target—the object or underlying resource 116 that is being changed (the noun) as well as the fields that include a key value for the new state of the target.
- ThreadID—an identifier of the audit trail adapter 216 that generates the set of entries 404 or an identifier of the set of entries 404 itself.
- Action—the way in which the object was changed (the verb).
- Action Type—the corresponding CRUD category (i.e., create, read, update, and delete).
- Event Name—Common name for the event that can be used to filter down to similar events.
- Description—A human readable description of the action taken; sometimes includes links to other pages within the application.
- Server—server ids or names, server location, or the like.
- Version—version of the code that is sending the events.
- Protocols—http vs https.
- Global Actor ID—if a customer is using Single Sign On, it might be important to also include a Global UID if it differs from the application specific ID.
- UniqueID—a unique identifier assigned to the particular entry 504.
- Signature—an entry that refers to a previous blockchain entry (e.g., prevuniqueidentifier)

Audit trails maintained in the blockchain data structure 412 can become a good source of information about particular transaction events in the shared computing environment 120. The most basic audit logging functionality desirably has a clear understanding of which transaction events should be recorded in the audit log/data structure 412. Audit trails are sometimes mixed with the event sourcing concept, which might be treated as the bigger set of events in respect to audit trail. The audit trail events are activities in the shared computing environment 120 triggered by users or functional users (endpoints, integrated applications, etc.), while event sourcing records all states of the application not necessarily triggered by a particular actor.

Monitoring of event sources provides another set of functions that can be extracted. One such function is governance and compliance regulations monitoring that can be checked against monitored event sources. Monitoring applied at the audit trail level gives the same type of functionality but in respect to concrete actors of the system. In order to be able to monitor and do the context analysis (e.g., correlation between individual audit trail events) or aggregation, records are desirably normalized and at least provide the possibility to extract the information mentioned above that is maintained in the publicly-available data portion 512 of each entry 504.

Figure 6:
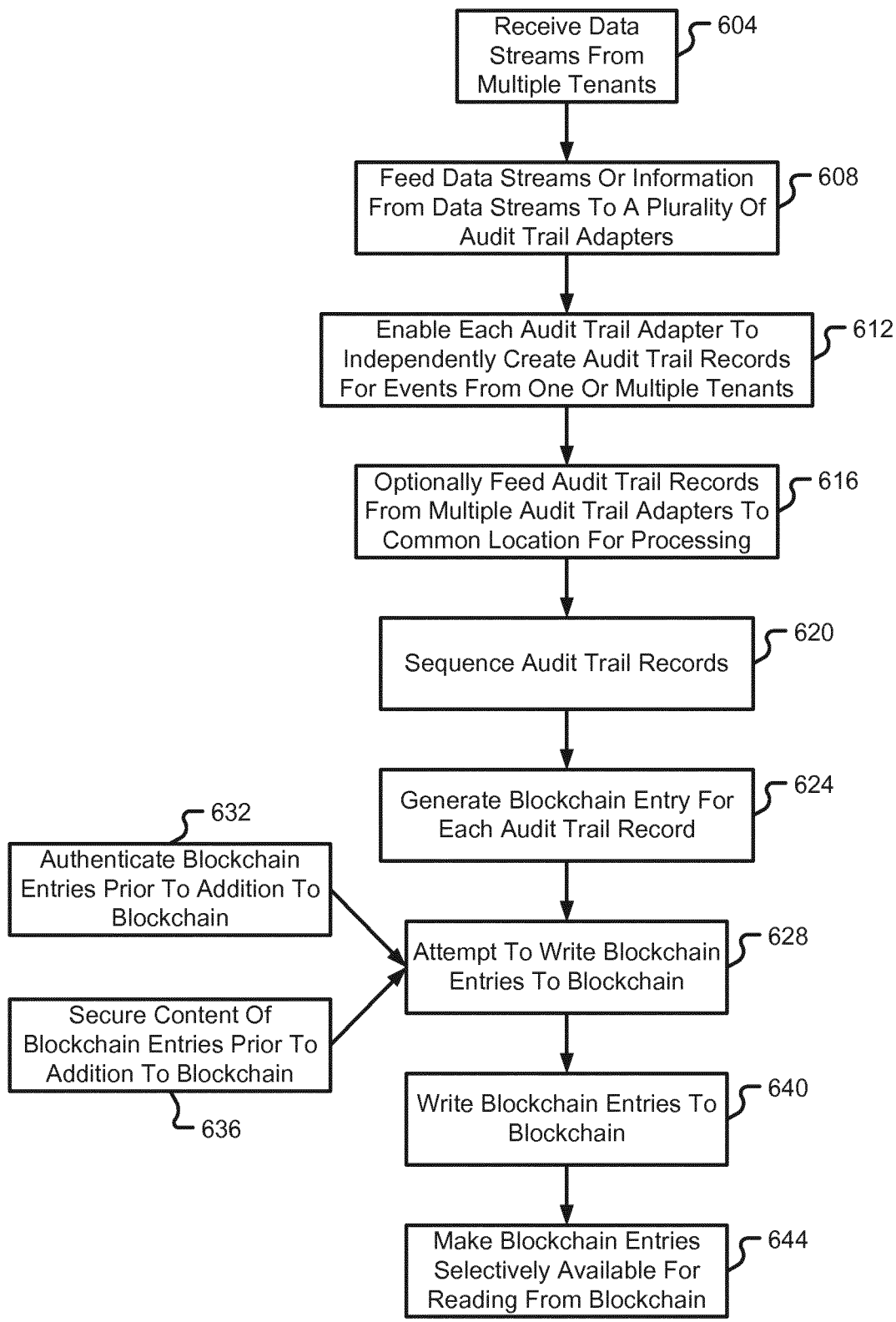
FIG. 6 is a flow diagram depicting a first method of operating an audit and reporting system in accordance with at least some embodiments of the present disclosure.

With reference now to FIG. 6, a first method of operating an audit and reporting system will be described in accordance with at least some embodiments of the present disclosure. The method begins by receiving data streams from a plurality of entities/tenants (step 604). These data streams may correspond to streams from a plurality of different tenants 204a, 204b, 204c.

The data streams or information from the received data streams are than provided to one or a plurality of audit trail adapters (step 608). The audit trail adapters are then enabled to independently create audit trail records for transaction events that occurred in the shared computing environment 120 on behalf of the tenant(s) (step 612). In some embodiments, the audit trail records may correspond to data elements that will be written to blockchain entries of a common blockchain data structure after the data elements and the blockchain entry have been appropriately authenticated/validated by other participating nodes to the blockchain.

The method continues with an optional step of feeding one or more of the audit trail records from the audit trail adapters to a common location for processing (step 616). In some embodiments, the common location may correspond to a blockchain server 408, an API gateway 224, or some other component operating within a RESTful service 220.

The audit trail records or entries are then sequenced (step 620). The audit trail records or entries may be sequenced according to time of the transaction, according to an assigned sequence number, and/or according to other considerations. The audit trail records or entries may be sequenced without concern for the entity/tenant that caused the transaction event to occur, but rather when the transaction event occurred relative to other transaction events in the shared computing environment 120.

The method continues by generating a blockchain entry for each audit trail record if such blockchain entries were not already created (step 624). The blockchain entries may be generated and/or processed individually or in a bulk/batch process. The method will then continue by attempting to write the blockchain entry (or batch of entries) to a common blockchain data structure (step 628). In some embodiments, this step may require authentication of the blockchain entry (step 632) and a securing of payload in the blockchain entry (step 636). Specifically, a signature of the blockchain entry may be analyzed to ensure that the signature references a valid entry that already belongs to the common blockchain data structure. The securing of the payload in the blockchain entry may include using one or more tokens provided by a tokenization service. In some embodiments, one or more keys may be used to calculate an AES-CMAC footprint. To achieve the footprinting (e.g., computing of hash value(s)), a symmetric key may be used, and PKI could be used for validating if a particular tenant can write to the audit trail system service through the API. Specifically, a tenant may validate the integrity of a blockchain entry by calculating a block AES-CMAC (e.g., hash value) using the tenant's symmetric key and then comparing the calculated hash value to a hash value received from the blockchain entry that is being validated. If the hash values match, then the tenant can confirm the integrity of the blockchain entry is valid.

Assuming that steps 628, 632, 636 are completed successfully, the method continues by writing the entry or set of entries to the common blockchain data structure (step 640). Once written to the common blockchain data structure, the entry or set of entries may be maintained on the peer-to-peer network and be made available for reading. In some embodiments, an entity/tenant may only be able to see, view, or know about an existence of blockchain entries that have their TenantID assigned thereto (step 644). All other blockchain entries not having that particular TenantID assigned thereto will not be reported or made available to nonassociated entities/tenants. However, because one entry will have a signature referring to a previous entry in the blockchain data structure, the entity/tenant associated with one entry will know about an existence of a previous blockchain entry by virtue of the fact that their associated entry points to the previous entry with its signature. However, the contents/payload of that previous entry may not be made available to the entity/tenant of the later-written blockchain entry.

Figure 7:
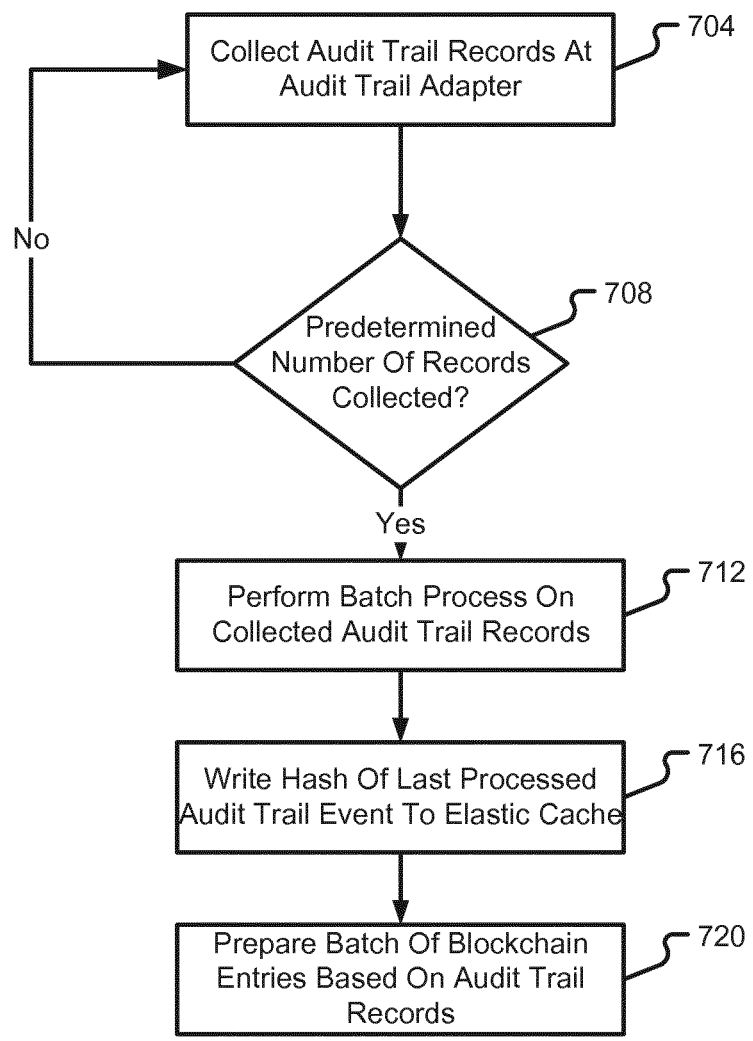
FIG. 7 is a flow diagram depicting a second method of operating an audit and reporting system in accordance with at least some embodiments of the present disclosure.

With reference now to FIG. 7 a second method of operating an audit and reporting system will be described in accordance with at least some embodiments of the present disclosure. The method begins by collecting audit trail records or potential blockchain entries at an audit trail adapter (step 704). The method continues by determining whether or not a predetermined number of records have been collected at the audit trail adapter (step 708). If this query is answered negatively, then the method returns to step 704. If, however, the query of step 708 is answered positively, then the method continues by allowing the audit trail adapter to perform a batch process on the collected audit trail records (step 712). In some embodiments, the batch processing may include allowing the audit trail adapter to create a plurality of blockchain entries based on the collected records and link each entry to a previous entry based on a time or sequence in which a transaction for the entry occurred.

The method may continue by generating and writing a hash of the last processed audit trail record to an elastic cache (step 716). Specifically, the hash may be generated on the blockchain entry that is created based on the last record in the collected records. The hash may be generated based on payload of the entry, a time of the transaction, a TenantID, a sequence number, or any other information that is contained in the blockchain entry. The hashing algorithm used to generate the hash may correspond to a one-way hashing algorithm. Thereafter, the batch of blockchain entries may be prepared for writing (as a batch) to the common blockchain data structure (step 720).

Figure 8:
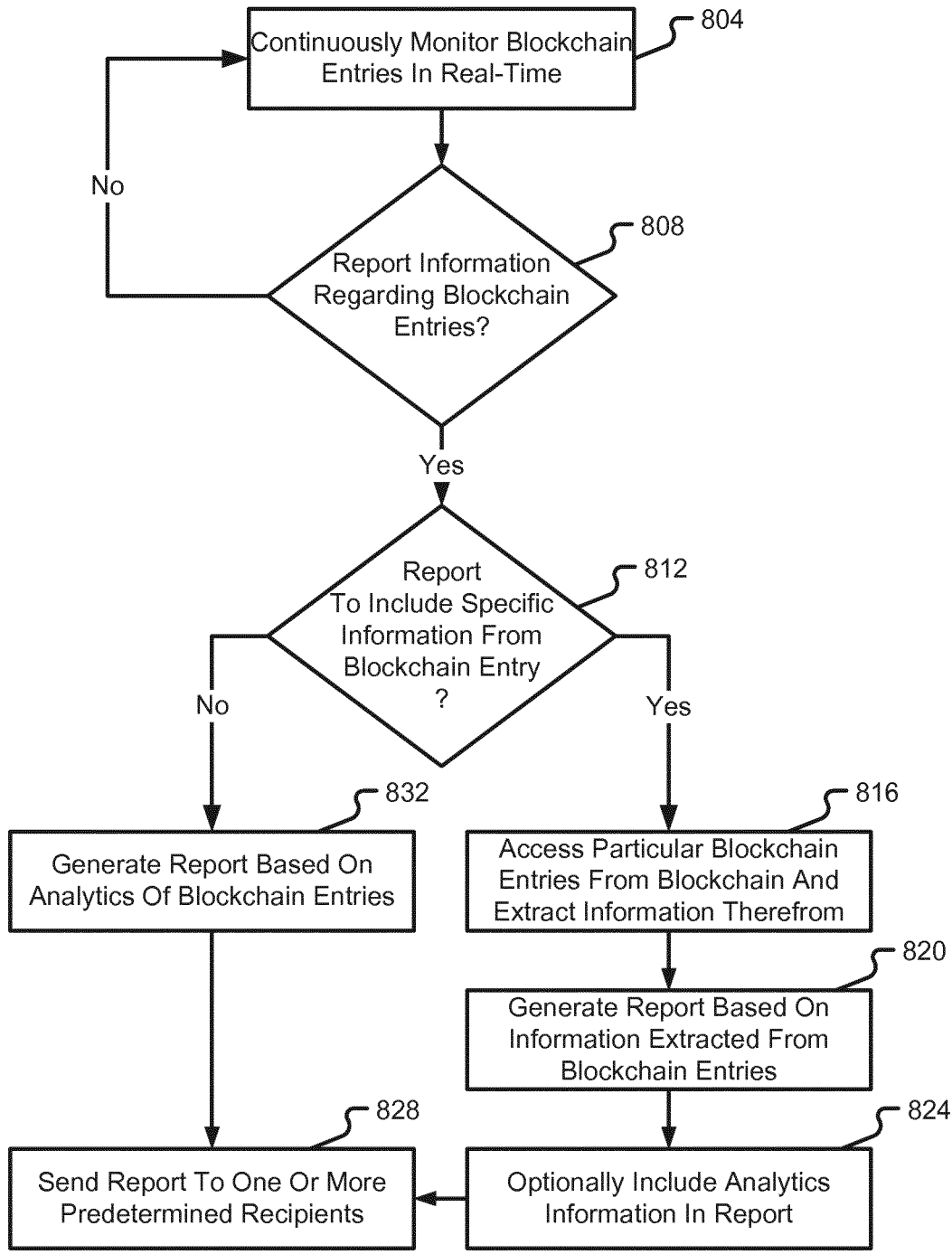
FIG. 8 is a flow diagram depicting a third method of operating an audit and reporting system in accordance with at least some embodiments of the present disclosure.

With reference now to FIG. 8, a third method of operating an audit and reporting system will be described in accordance with at least some embodiments of the present disclosure. The method begins by continuously monitoring blockchain entries that are created and/or added to a common blockchain data structure in real-time (step 804). It should be appreciated that this analysis may occur in near-real-time without departing from the scope of the present disclosure.

The method continues by determining whether or not any of the analyzed entries creates a trigger to generate a report (step 808). If not, then the method will return to step 804. If so, then the method continues by determining if the report should contain specific information from the blockchain entry or entries that triggered the reporting action (step 812). If the query is answered affirmatively, then particular blockchain content will be accessed and that information will be extracted therefrom (step 816). In some embodiments, accessing particular content may require execution of a de-tokenization process, which may be conducted through an external tokenization service.

The method will continue with the generation of a report based on the information extracted from the blockchain entry or entries (step 820). The report may include the extracted information itself or a summarization of the extracted information (e.g., a listing of sequence numbers from the entries, a listing of timestamps from the entries, or a reporting of a range of time over which the entries span). In some embodiments, the report may optionally include analytics information (step 824). Analytics information that may be included in the report can include the types of reasons for identifying the blockchain entry or entries as a reporting trigger. For instance, if a blockchain entry was identified as anomalous, then the reason for identifying the blockchain entry as anomalous may be included in the analytics information. Any other statistical representation of information from a plurality of blockchain entries may also be included in the analytics information of a report.

The method will then continue with the transmission of the report to one or more predetermined recipients (step 828). It should be appreciated that predetermined recipients may be members of the entity/tenant that is associated with the triggering blockchain entry or entries written to the blockchain data structure. Alternatively or additionally, the predetermined recipients may include third parties to the entity/tenant that is associated with the triggering blockchain entry or entries.

Referring back to step 812, if the report is not to include entry-specific information, then the method will include generating a non-specific report in which analytics of the triggering blockchain entry or entries and/or other related blockchain entries are incorporated into the report (step 828). Thereafter, the report is transmitted to the one or more predetermined recipients.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

The invention claimed is:

1. A method for maintaining a log of events in a shared computing environment, the method comprising:
    receiving, at an audit trail adapter provided on an audit server, one or more raw data streams from the shared computing environment that include transactions conducted in the shared computing environment by a first entity, a second entity that is different from the first entity, and a third entity that is different from the first entity and the second entity;
    creating, by the audit trail adapter, based on the received one or more raw data streams, a first blockchain entry for a first transaction conducted in the shared computing environment for the first entity;
    creating, by the audit trail adapter, based on the received one or more raw data streams, a second blockchain entry for a second transaction conducted in the shared computing environment for the second entity, wherein the second blockchain entry includes a signature that points to the first blockchain entry;
    creating, by the audit trail adapter, based on the received one or more raw data streams, a third blockchain entry for a third transaction conducted in the shared computing environment for the third entity, wherein the third blockchain entry includes a signature that points to the second blockchain entry; and
    causing the first, second, and third blockchain entries to be written to a common blockchain data structure in a database that is made accessible to the first entity, the second entity, and the third entity;
    wherein the third entity is capable of determining that the second blockchain entry exists in the common blockchain data structure but is unable to access any payload in the second blockchain entry, and wherein the third entity is incapable of determining that the first blockchain entry exists in the common blockchain data structure because the third blockchain entry does not point to the first blockchain entry.

2. The method of claim 1, wherein the third entity is capable of accessing a payload in the third blockchain entry by using a payload de-tokenization service.

3. The method of claim 1, wherein the audit trail adapter comprises a plurality of instances of the audit trail adapter.

4. The method of claim 1, wherein a payload of the first blockchain entry is pseudonymized with a first set of pseudonyms, wherein a payload of the second blockchain entry is pseudonymized with a second set of pseudonyms, and wherein the first set of pseudonyms is different from the second set of pseudonyms.

5. The method of claim 1, wherein the first transaction occurred in the shared computing environment prior to the second transaction and wherein blockchain entries in the common blockchain data structure are ordered according to a time of occurrence of the transactions.

6. The method of claim 1, further comprising:
receiving a request, from a requesting entity, for information about one or more blockchain entries related to the first entity;
using a unique identifier assigned to the first entity to identify the one or more blockchain entries in the common blockchain data structure that are related to the first entity; and
providing information from the identified one or more blockchain entries back to the requesting entity.

7. The method of claim 6, further comprising:
calculating a hash value using a first tenant's symmetric key; and
comparing the calculated hash value with a hash value received from the first blockchain entry to verify an integrity of the first blockchain entry.

8. The method of claim 7, wherein the first entity calculates the calculated hash value.

9. The method of claim 1, wherein the first and second blockchain entries are immutable records in the common blockchain data structure.

10. The method of claim 1, wherein the shared computing environment comprises a plurality of Internet-connected server resources that provide one or more services to client devices on behalf of the first entity and the second entity.

11. The method of claim 1, further comprising:
receiving the first and second blockchain entries at an Application Programming Interface (API) gateway; and
enabling the API gateway to collect the first and second blockchain entries and write the first and second blockchain entries to the common blockchain data structure.

12. The method of claim 1, wherein a payload of the first blockchain entry is encrypted with a first encryption key, wherein a payload of the second blockchain entry is encrypted with a second encryption key, and wherein the first encryption key is different from the second encryption key.

13. A method for maintaining a log of events in a shared computing environment, the method comprising:
receiving, at an audit trail adapter provided on an audit server, one or more raw data streams from the shared computing environment that include transactions conducted in the shared computing environment by a first entity and a second entity that is different from the first entity;
creating, by the audit trail adapter, based on the received one or more raw data streams, a first blockchain entry for a first transaction conducted in the shared computing environment for the first entity;
creating, by the audit trail adapter, based on the received one or more raw data streams, a second blockchain entry for a second transaction conducted in the shared computing environment for the second entity, wherein the second blockchain entry includes a signature that points to the first blockchain entry; and
causing the first and second blockchain entries to be written to a common blockchain data structure in a database that is made accessible to both the first entity and the second entity
wherein the signature in the second blockchain entry that points to the first blockchain entry is signed by the audit trail adapter that receives the one or more raw data streams and wherein an authentication entity authenticates the signature in the second blockchain entry prior to enabling the second blockchain entry to be written to the common blockchain data structure.

14. The method of claim 13, wherein the audit trail adapter comprises a plurality of instances of the audit trail adapter.

15. A method for maintaining a log of events in a shared computing environment, the method comprising:
receiving, at an audit trail adapter provided on an audit server, one or more raw data streams from the shared computing environment that include transactions conducted in the shared computing environment by a first entity and a second entity that is different from the first entity;
creating, by the audit trail adapter, based on the received one or more raw data streams, a first blockchain entry for a first transaction conducted in the shared computing environment for the first entity;
creating, by the audit trail adapter, based on the received one or more raw data streams, a second blockchain entry for a second transaction conducted in the shared computing environment for the second entity, wherein the second blockchain entry includes a signature that points to the first blockchain entry;
causing the first and second blockchain entries to be written to a common blockchain data structure in a database that is made accessible to both the first entity and the second entity;
analyzing blockchain entries that are written to the common blockchain data structure;
in response to analyzing the blockchain entries that are written to the common blockchain data structure, determining that at least one blockchain entry written to the common blockchain data structure corresponds to an anomalous activity for an entity that is associated with the at least one blockchain entry; and
generating a report for the at least one blockchain entry that is determined to correspond to an anomalous activity for the entity that is associated with the at least one blockchain entry.

16. The method of claim 15, wherein the audit trail adapter comprises a plurality of instances of the audit trail adapter.

17. The method of claim 15, wherein the first transaction occurred in the shared computing environment prior to the second transaction and wherein blockchain entries in the common blockchain data structure are ordered according to a time of occurrence of the transactions.

18. The method of claim 15, further comprising:
receiving a request, from a requesting entity, for information about one or more blockchain entries related to the first entity;
using a unique identifier assigned to the first entity to identify the one or more blockchain entries in the common blockchain data structure that are related to the first entity; and
providing information from the identified one or more blockchain entries back to the requesting entity.

19. The method of claim 15, wherein the shared computing environment comprises a plurality of Internet-connected server resources that provide one or more services to client devices on behalf of the first entity and the second entity.

20. The method of claim 15, wherein a payload of the first blockchain entry is encrypted with a first encryption key, wherein a payload of the second blockchain entry is encrypted with a second encryption key, and wherein the first encryption key is different from the second encryption key.

\* \* \* \* \*